(12) United States Patent
Stegovec

(10) Patent No.: US 11,312,291 B2
(45) Date of Patent: Apr. 26, 2022

(54) ARTICULATED ELEMENT BETWEEN THE LIGHT SOURCE CARRIER FRAME AND THE LEVELING MOTOR IN A HEADLIGHT OF A MOTOR VEHICLE

(71) Applicant: HELLA Saturnus Slovenija d.o.o., Ljubljana (SI)

(72) Inventor: Edwin Stegovec, Izola (SI)

(73) Assignee: HELLA Saturnus Slovenija d.o.o., Ljubljana (SI)

( * ) Notice: Subject to any disclaimer, the term of this patent is extended or adjusted under 35 U.S.C. 154(b) by 0 days.

(21) Appl. No.: 16/820,836

(22) Filed: Mar. 17, 2020

(65) Prior Publication Data
US 2020/0298746 A1    Sep. 24, 2020

(30) Foreign Application Priority Data
Mar. 18, 2019  (EP) .................................... 19163476

(51) Int. Cl.
*B60Q 1/076*    (2006.01)
*B60Q 1/068*    (2006.01)

(52) U.S. Cl.
CPC ........... *B60Q 1/076* (2013.01); *B60Q 1/0683* (2013.01); *B60Q 2200/32* (2013.01)

(58) Field of Classification Search
CPC ...... B60Q 1/076; B60Q 1/0683; B60Q 1/068; B60Q 2200/32
See application file for complete search history.

(56) References Cited

U.S. PATENT DOCUMENTS 5,993,032 A * 11/1999 Herbers ................. B60Q 1/076
362/515
6,550,947 B1 * 4/2003 Kibayashi .............. B60Q 1/076
362/515
(Continued)

FOREIGN PATENT DOCUMENTS

DE    102006056677 A1    6/2008
DE    102009033910 A1    1/2011
(Continued)

*Primary Examiner* — Rajarshi Chakraborty
*Assistant Examiner* — Michael Chiang
(74) *Attorney, Agent, or Firm* — Renner, Otto, Boisselle & Sklar, LLP

(57) ABSTRACT

The invention relates to an articulated element between a light source carrier frame and a leveling motor in a headlight of a motor vehicle, which is used to transform the linear movement of the drive shaft of the leveling motor into the rotation of the carrier frame for a certain angle. The light source carrier frame with one or several light sources is pivotally mounted to the headlight housing that is later on fixed to the car structure. The leveling motor with a drive shaft is fixed to the headlight housing, and can push its drive shaft in or out in a primarily linear direction. Undesirable radial force acting on the drive shaft are minimized or eliminated by the use of the articulated element according to the invention. The articulated element comprises a hollow cylinder adapted for insertion of a head fixedly attached to the drive shaft of the leveling motor and a hinge which consists of a first hinge element, which is fixedly attached to the hollow cylinder, and of a second hinge element, which is fixedly attached to a bayonet base or is formed as a uniform part of the carrier frame and whereby the cylinder axis is essentially parallel to the hinge axis. The horizontal component of the radial force onto the drive shaft is eliminated by allowing the hollow cylinder to slide along its axis relative to the drive shaft. At the same time the hinge in (Continued)

Figure 1:
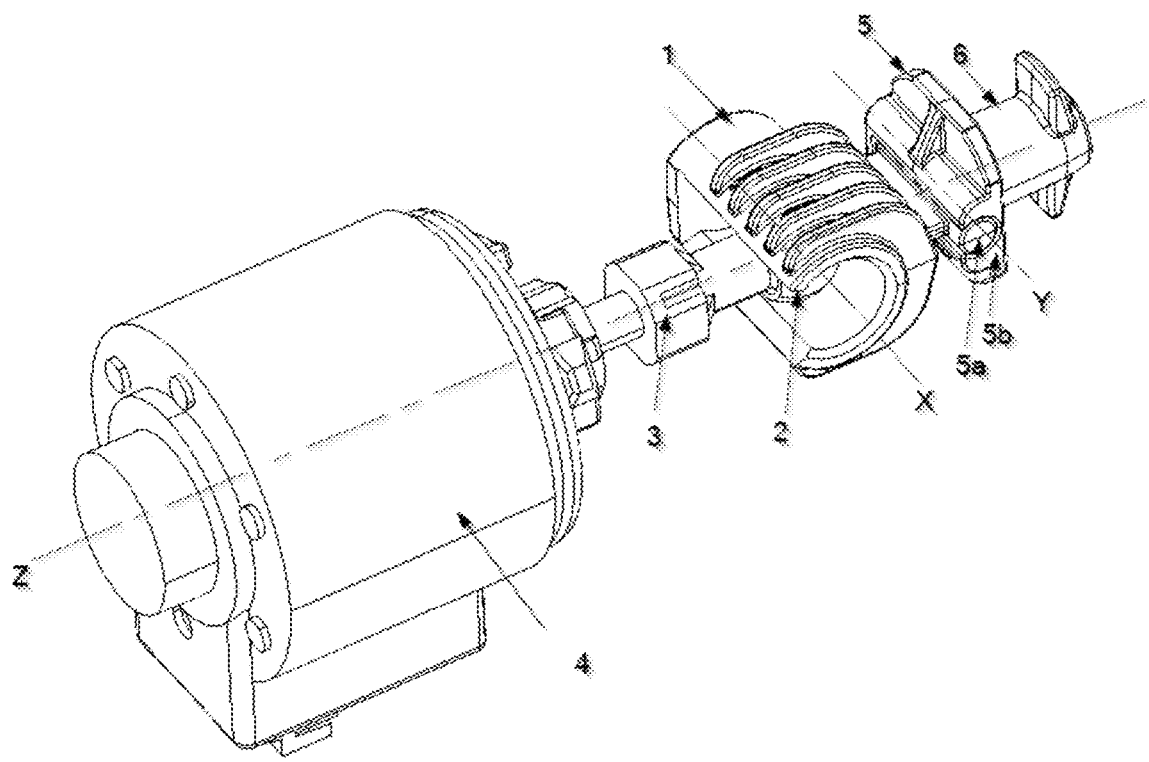

combination with the hollow cylinder pivoting around the head minimizes radial force on the drive shaft in vertical direction.

12 Claims, 5 Drawing Sheets

(56) References Cited

U.S. PATENT DOCUMENTS

| | | | | |
|---|---|---|---|---|
| 6,976,773 | B2* | 12/2005 | Cavanna | B60Q 1/0683 |
| | | | | 362/427 |
| 8,485,706 | B2* | 7/2013 | Chien | B60Q 1/076 |
| | | | | 362/515 |
| 9,327,637 | B2* | 5/2016 | Kondo | B60Q 1/0683 |
| 2004/0037086 | A1* | 2/2004 | Pascutiu | B60Q 1/115 |
| | | | | 362/526 |
| 2018/0043817 | A1* | 2/2018 | Kobecky | B60Q 1/076 |
| 2018/0118092 | A1* | 5/2018 | Jakobsmeyer | B60Q 1/068 |
| 2018/0306233 | A1* | 10/2018 | Burton | F16C 11/0642 |
| 2019/0061603 | A1* | 2/2019 | Grimm | B60Q 1/0683 |
| 2019/0390707 | A1* | 12/2019 | Burton | F16C 11/0623 |
| 2020/0055441 | A1* | 2/2020 | Lauber | B60Q 1/0683 |

FOREIGN PATENT DOCUMENTS

| | | | | |
|---|---|---|---|---|
| EP | 1595739 | A1 | 11/2005 | |
| EP | 2383146 | A1 | 11/2011 | |
| EP | 2551153 | A1 | 1/2013 | |
| GB | 2233754 | A | 1/1991 | |
| KR | 20050023893 | A | 3/2005 | |
| WO | WO-2017001143 | A1* | 1/2017 | ............ F21S 41/657 |

* cited by examiner

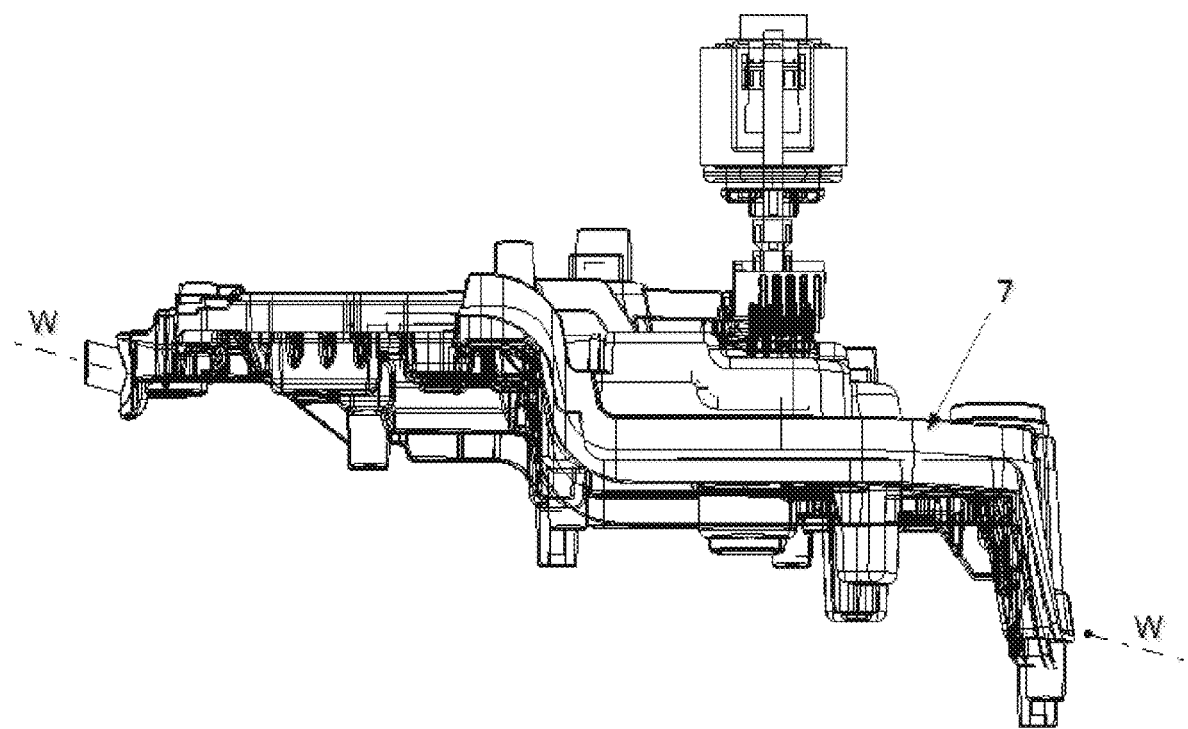
Figure 3a – top view

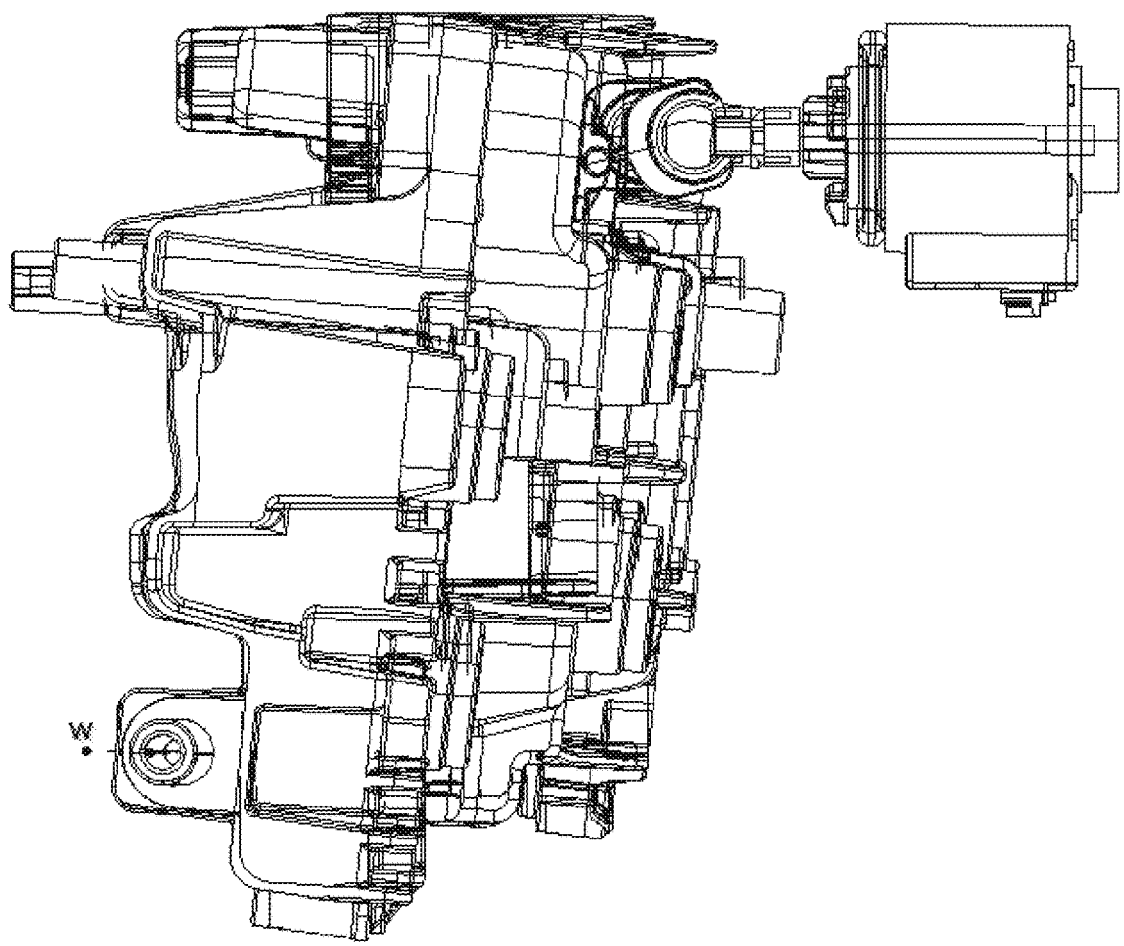
Figure 3b - side view

ARTICULATED ELEMENT BETWEEN THE LIGHT SOURCE CARRIER FRAME AND THE LEVELING MOTOR IN A HEADLIGHT OF A MOTOR VEHICLE

The invention relates to an articulated element which is used for the force transmission between the light source carrier frame and the leveling motor in order to regulate the angle of the light beam of a headlight in a motor vehicle. The light source carrier frame with one or several light sources is pivotally mounted to the headlight housing that is later on fixed to the car structure. The leveling motor with a drive shaft is fixed to the headlight housing and can push the drive shaft in or out in a primarily linear direction. The leveling motor is used to drive said carrier frame, i.e. to pivot said carrier frame around the carrier frame axis for a certain angle, thereby changing the angle of a light beam for that angle. For example, the direction of the light source beam is, due to the carrier frame rotation, directed downwards, so the light does not disturb the driver who is approaching.

The connection point of the drive shaft to the carrier frame is above or below the carrier frame axis, so that the linear movement of the drive shaft is translated into the rotation of the carrier frame for a certain angle. Given that the carrier frame is pivotally mounted to the headlight housing and that the leveling motor is fixedly attached to the same housing, undesirable radial force act on the drive shaft when this linear movement of the drive shaft is translated into the rotational movement of the carrier frame as the paths of movement are not the same. To minimize or eliminate said radial force the articulated element according to the invention is used.

PRIOR ART AND TECHNICAL PROBLEM

If the drive shaft was directly connected to the carrier frame without any articulated element and the leveling motor drive shaft moves linearly from its nominal position, the drive shaft and the carrier frame would be exposed to undesirable tension in radial direction due to said difference between the linear movement of the drive shaft and the rotational movement of the carrier frame. In this case, if the carrier frame axis was horizontal, and the drive shaft axis was horizontal and perpendicular to the vertical plane through the carrier frame axis, the radial force on the drive shaft would be only in vertical direction. If the carrier frame axis was vertical, and the axis of the drive shaft was horizontal, the radial force on the drive shaft would be only in horizontal direction. In this context horizontal refers to the direction essentially parallel to the road surface and vertical refers to the direction essentially perpendicular to the road surface.

In practice, the relation between the drive shaft axis and the carrier frame axis is not as regular as in two hypothetical examples described above. Therefore in every such case we would have basically two components of the radial force acting on the drive shaft, e.g. in the horizontal direction and in the vertical direction.

Thus when the linear movement of the drive shaft is translated into the rotational movement of the carrier frame around the carrier frame axis, the drive shaft is exposed to radial force which has negative impact on the functioning and lifetime of the leveling motor, because the producers of leveling motors guarantee their proper functioning only up to a certain amount of radial force.

To minimize said radial force, an articulated element was introduced which connects the carrier frame and the leveling motor.

Presently available leveling motors to drive the carrier frame have a drive shaft with a head, which is essentially of a spherical shape fixedly attached to the drive shaft. So in the context of this application, where reference is made hereafter to the radial force acting on the drive shaft, this also applies to the head and vice versa.

Given the fact that the drive shaft with the head can move only in linear direction along its axis (the drive shaft does not move in radial directions), in order to minimize the radial force as much as possible, preferably to eliminate the radial force acting on the drive shaft, when the carrier frame pivots around the carrier frame axis, an articulated element had to be introduced between the drive shaft and the carrier frame. This means that the construction of the articulated element enables the split of previously one connection point between the drive shaft and the carrier frame into two connection points, namely a first connection point between one side of the articulated element and the drive shaft and a second connection point between the other side of the articulated element and the carrier frame. The articulated element enables the displacement movement of the first connection point relative to the second connection point in all radial directions relative to the drive shaft axis thereby eliminating or minimizing any radial force on the drive shaft.

In the state of the art there are known solutions in which the radial force on the drive shaft is minimized by applying an articulated element which comprises the hollow cylinder adapted for receiving the head, a bayonet base which is fixedly attached to the carrier frame, and a connecting element, which is flexible, between the hollow cylinder and the bayonet base. The head is located inside the hollow cylinder, whereby the dimensions of the hollow cylinder and the head are such that the head cannot fall out of the hollow cylinder and the hollow cylinder can still slide freely along the cylinder axis relative to the drive shaft axis.

The connecting element due to its flexibility allows pivotal movement of the hollow cylinder relative to the bayonet base. The plane on which the hollow cylinder moves relative to the bayonet base is essentially perpendicular to the hollow cylinder axis.

By this construction of the articulated element, the displacement movement between the first and the second connection points relative to one another in all directions, is enabled and both components of the radial force on the drive shaft are reduced, namely the component in the direction of the hollow cylinder axis and the direction essentially perpendicular to this axis. However, the component of the radial force in the hollow cylinder axis direction is practically eliminated due to the sliding of the hollow cylinder along its axis, whereas the component of the radial force perpendicular to the hollow cylinder axis is not sufficiently eliminated. This component progresses in the direction of the movement of the connecting element from its neutral position and is dependent on the deviation angle of said connecting element from its neutral position and on the material properties of said connecting element. As a result, the undesirable radial force in this direction is still present, therefore, the performance of the leveling motor is deteriorated and its lifetime is shortened.

DESCRIPTION OF THE INVENTION

It is an object of the present invention to provide an improved solution for the articulated element which overcomes the above mentioned problems.

Figure 2:
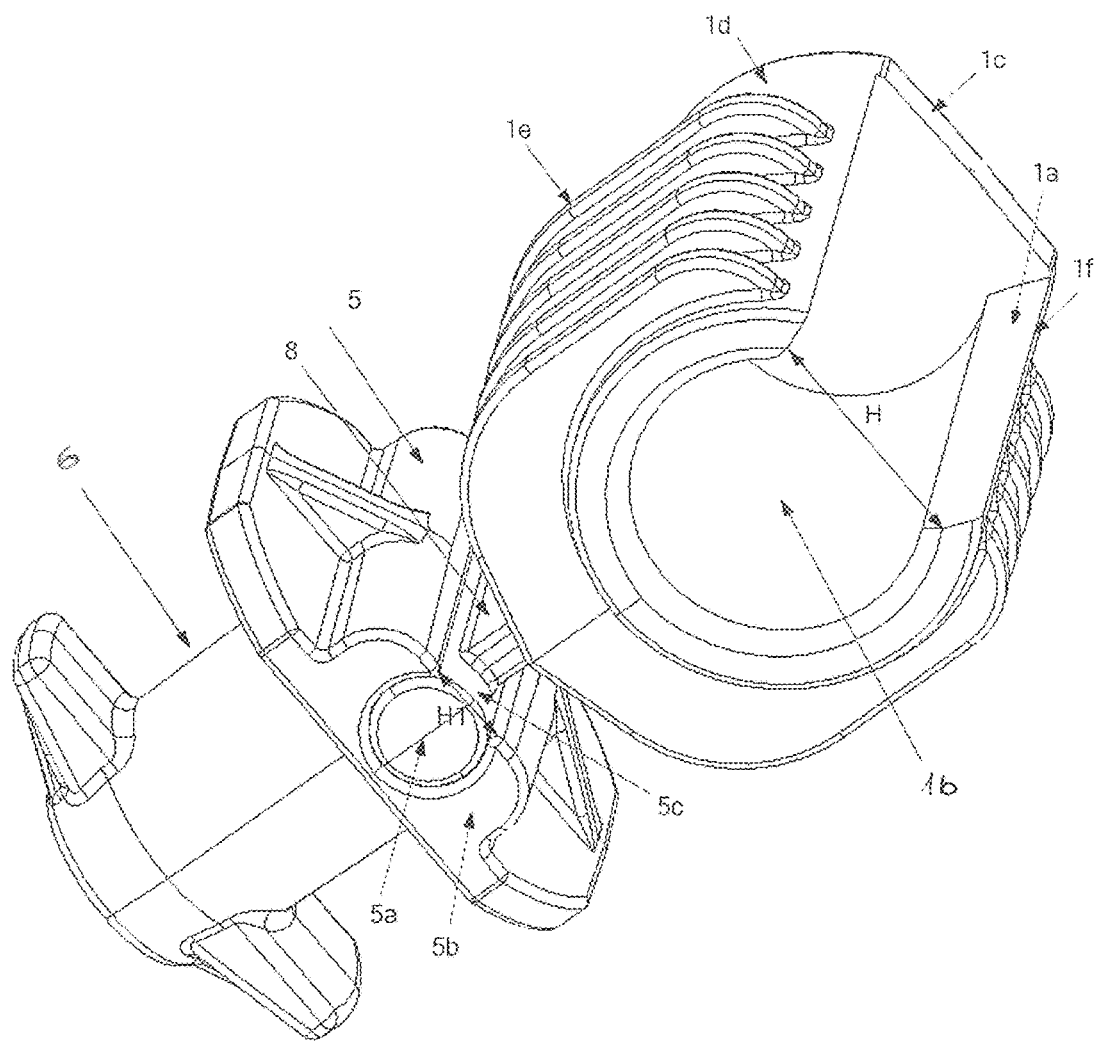

The articulated element according to the invention is further described below and presented in figures:

FIG. 1 presents the neutral position of the articulated element connected to the leveling motor FIG. 2 presents the articulated element FIGS. 3a and 3b present the position of the articulated element when the drive shaft of a leveling motor is moved in linear direction backward (top view and side view)

Figure 4:
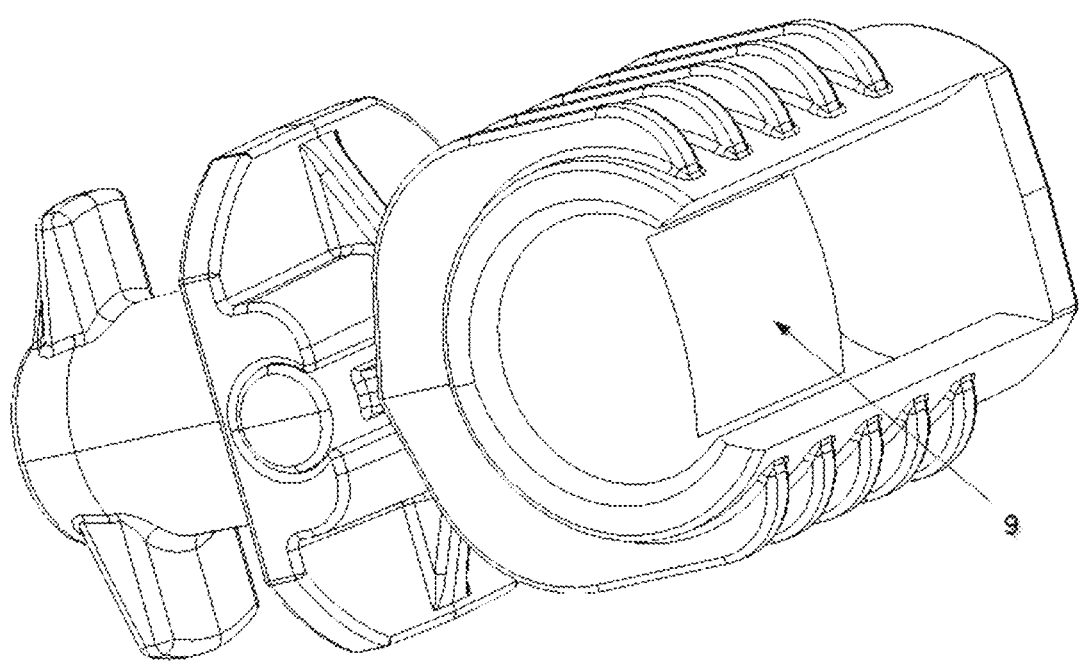

FIG. 4 presents the adjustment range defined by the movement of the hollow cylinder relative to the head of the drive shaft.

Articulated element between the light source carrier frame and the leveling motor in a headlight of a motor vehicle according to the invention, which is presented in FIGS. 1 to 4, comprises:
- a hollow cylinder 1 with a cylinder axis X, whereby said hollow cylinder 1 is adapted for insertion of a head 2 fixedly attached to a drive shaft 3 of a leveling motor 4 and
- a hinge 5 with a hinge axis Y, wherein the hinge 5 consists of a first hinge element 5a, which is fixedly attached to the hollow cylinder 1, and of a second hinge element 5b, which is fixedly attached to a bayonet base 6 or is formed as a uniform part of a carrier frame 7, to enable the rotation of the hollow cylinder 1 relative to the head 2 of the drive shaft 3 around said hinge axis Y.

In a preferred embodiment the cylinder axis X is essentially parallel to the hinge axis Y.

The leveling motor 4 moves the drive shaft 3 only in linear direction, i.e. pushes the drive shaft 3 with the attached head 2, which is essentially of a spherical shape, back and forth along a drive shaft axis Z. The head 2 is centrally fixedly connected to the drive shaft 3.

The hollow cylinder 1 is designed as a C receiving geometry, i.e. said hollow cylinder 1 is in its cross section shaped as a letter C with a side opening 1a along the hollow cylinder axis X. The head 2 is located inside the hollow cylinder 1, whereby the dimensions of the hollow cylinder 1, i.e. its cavity, the dimensions of the head 2 and the height H of the side opening 1a are such that the head 2 cannot fall out of the hollow cylinder 1 but the hollow cylinder 1 can still slide freely along the hollow cylinder axis X relative to the drive shaft axis Z. The dimensions of the hollow cylinder 1 in the cross section perpendicular to the cylinder axis X, is thus slightly larger than the dimensions of the head 2 in its cross section perpendicular to the cylinder axis X and the height H of the side opening 1a is smaller than the diameter of the head 2.

The side opening 1a is necessary to enable the sliding of the hollow cylinder 1 along its axis X relative to the drive shaft axis Z. Furthermore, the height H of the side opening 1a defines also the allowable angle of rotation of the hollow cylinder 1 relative to the head 2 and is in correlation with the angle of rotation allowed by the construction of the hinge 5, i.e. with the angle of rotation of the hollow cylinder 1 around the hinge axis Y, as will be explained in detail below. The larger the side opening 1a in this direction, the larger is the allowable angle of rotation.

The hollow cylinder 1 can be made as an "open design", i.e. the hollow cylinder 1 is opened at both of its base ends 1b, or as a "closed design", i.e. the hollow cylinder 1 is closed at one end with a wall 1c, so that the head 2 is inserted into the hollow cylinder 1 through the open end.

Optionally, the external surface 1d of the hollow cylinder 1 can include reinforcements 1e which are preferably in the form of ribs. Said ribs 1e and the wall 1c at one base end of the hollow cylinder 1 serve to reinforce the construction of the hollow cylinder 1.

In a preferred embodiment the first hinge 5a element is fixedly connected to the hollow cylinder 1 through a rigid linking element 8, whereby said linking element 8 is connected to the hollow cylinder 1 and the first hinge element 5a so that the cylinder axis X is parallel to the hinge axis Y.

Said linking element 8 provides a certain distance of the hollow cylinder 1 from the hinge 5, i.e. between the cylinder axis X and the hinge axis Y, with which the limit of the displacement movement of the hollow cylinder 1 in the direction essentially perpendicular to the cylinder axis X is defined. Namely at the constant deviation angle of the hinge 5, the longer the linking element 8, the larger the displacement movement of the hollow cylinder 1 in the direction essentially perpendicular to the cylinder axis X.

Preferably said linking element 8 is made as elongated member and extends along the entire length of the hollow cylinder 1 and the first hinge element 5a. Preferably the first hinge element 5a is in a form of cylinder with a circular cross section.

Preferably the first hinge element 5a, the linking element 8 and the hollow cylinder 1 are made of one piece.

The second hinge element 5b is fixedly attached to the bayonet base 6 or is formed as a uniform part of a carrier frame 7. Preferably the second hinge element 5b is designed as a C receiving geometry, i.e. the second hinge element 5b has in a cross section a form of a letter C, with an opening 5c in the direction of the linking element 8. The height H1 of the opening 5c of the second hinge element 5b and its position is in correlation with the height H of the side opening 1a of the hollow cylinder 1 and its position. The opening 5c is positioned so that analogous rotation of the first hinge element 5a and consequently of the hollow cylinder 1 around the hinge axis Y, namely up or down relative to the head 2, is enabled. The height H1 of the opening 5c is such that at the maximum rotation of the first hinge element 5a and consequently of the hollow cylinder 1 around the hinge axis Y, the edges 1f of the side opening 1a of the hollow cylinder 1 do not touch the drive shaft 3 and thus the hollow cylinder 1 can still slide freely along its axis X relative to the drive shaft axis Z.

Said first hinge element 5a is inserted in said second hinge element 5b to form a hinge 5 and the rotation of the first hinge element 5a within the second hinge element 5b is enabled around the hinge axis Y.

Since both hinge elements 5a, 5b are preferably also made of plastic material, it is possible, with the selection of the plastic material, to regulate the friction force.

The adjustment range 9 shown in FIG. 4 represents the movement (range) of the center of the head 2 relative to the axis Y. Due to the invention, the adjustment range 9 is in a form of a rectangular section on a cylindrical surface. Within this range 9 the articulated element of the invention minimizes the radial force acting on the head 2 and consequently on the drive shaft 3. Said adjustment range 9 is larger than in the presently known and used articulated elements.

In one of possible embodiments, the carrier frame axis W, the hollow cylinder axis X and the drive shaft axis Z are essentially horizontal. In neutral position no radial force is acting on the drive shaft 3 of the leveling motor 4 even without the articulated element. When the direction of the light source beam is to be changed, for example downwards, the leveling motor 4 pushes the drive shaft 3 with the attached head 2 forward in linear direction. The linear movement of the drive shaft 3 is transferred to rotation of the carrier frame 7, thereby changing the angle of the light source beam downwards. In this embodiment the vertical plane passing through the carrier frame axis W and the vertical plane passing through the drive shaft axis Z are not perpendicular to each other but are positioned at one another at a certain angle, so both, vertical and horizontal component of the radial force are acting on the drive shaft 3. When the leveling motor 4 pushes the drive shaft 3 with the attached head 2 forward and consequently the carrier frame 7 pivots forward, the articulated element of the invention eliminates possible radial force on the drive shaft 3 by allowing the displacement movement of the first connection point between one side of the articulated element and the drive shaft relative to the second connection point between the other side of the articulated element and the carrier frame in the radial direction of the drive shaft 3 without exerting any force on the drive shaft 3. The horizontal component of the radial force onto the drive shaft 3 is eliminated by allowing the hollow cylinder 1 to slide along its axis X relative to the drive shaft axis Z. At the same time the hinge 5 in combination with the hollow cylinder 1 pivoting around the head 2 allows for displacement movement of the second connection point upwards or downwards without exerting any radial force on the drive shaft 3 in vertical direction.

The invention claimed is:

1. An articulated element between a light source carrier frame and a leveling motor in a headlight of a motor vehicle, wherein said articulated element is directly connected to a linearly movable drive shaft of the leveling motor by a head and to the carrier frame, to translate a linear movement of the drive shaft of the leveling motor into a rotational movement of the carrier frame around a carrier frame axis, said articulated element comprises:
    a hollow cylinder with a cylinder axis, whereby said hollow cylinder is adapted for insertion of the head fixedly attached to the drive shaft of the leveling motor and
    a hinge with a hinge axis, wherein the hinge consists of a first hinge element, which is fixedly attached to the hollow cylinder, and of a second hinge element, which is fixedly attached to a bayonet base or is formed as a uniform part of the carrier frame, to enable the rotation of the hollow cylinder relative to the head of the drive shaft around said hinge axis, wherein the first hinge element is in a form of a cylinder with a circular cross section.

2. The articulated element according to claim 1, wherein the cylinder axis is essentially parallel to the hinge axis.

3. The articulated element according to claim 1, wherein the hollow cylinder is formed as a C receiving geometry and is, in its cross section shaped as a letter C with a side opening of a height along the cylinder axis.

4. The articulated element according to claim 3, wherein the dimensions of the head in its cross section perpendicular to the cylinder axis and the height of the side opening are such that the head cannot fall out of the hollow cylinder but the hollow cylinder can still slide freely along the hollow cylinder axis.

5. The articulated element according to claim 1, wherein the hollow cylinder is opened at both of its base ends, or is closed at one end with a wall.

6. The articulated element according to claim 1, wherein the first hinge element is fixedly connected to the hollow cylinder through a rigid linking element, whereby said linking element is connected to the hollow cylinder and the first hinge element so that the cylinder axis is essentially parallel to the hinge axis.

7. The articulated element according to claim 6, wherein the second hinge element is formed as a C receiving geometry and has in a cross section a form of a letter C, with an opening in the direction of the linking element.

8. The articulated element according to claim 7, wherein the opening is positioned so that analogous rotation of the first hinge element and consequently of the hollow cylinder around the hinge axis, namely up or down relative to the head, is enabled.

9. The articulated element according to claim 7, wherein a height of the opening is such that, at a maximum rotation of the first hinge element and consequently of the hollow cylinder around the hinge axis, edges of a side opening along the hollow cylinder do not touch the drive shaft and thus the hollow cylinder can still slide freely along its axis relative to the drive shaft axis.

10. The articulated element according to claim 1, wherein an adjustment range is in a form of a rectangular section on a cylindrical surface and represents a movement of a center of the head relative to the hinge axis and wherein within said range the radial force acting on the head and consequently on the drive shaft is minimized.

11. The articulated element according to claim 1, wherein the hinge is rotatable about the hinge axis with only one degree of freedom.

12. The articulated element according to claim 1, wherein the second hinge is fixedly attached to a bayonet base.

* * * * *